United States Patent
Kondo

(10) Patent No.: US 7,005,183 B2
(45) Date of Patent: Feb. 28, 2006

(54) APPLICATION SHEET USED FOR PRESSURE-SENSITIVE ADHESIVE SHEET FOR PAINTING

(75) Inventor: Hiroshi Kondo, Saitama-Ken (JP)

(73) Assignee: Lintec Corporation, (JP)

(*) Notice: Subject to any disclaimer, the term of this patent is extended or adjusted under 35 U.S.C. 154(b) by 33 days.

(21) Appl. No.: 10/106,307

(22) Filed: Mar. 26, 2002

(65) Prior Publication Data

US 2002/0192462 A1 Dec. 19, 2002

(30) Foreign Application Priority Data

Mar. 28, 2001 (JP) ............................. 2001-094261

(51) Int. Cl.
B32B 7/12 (2006.01)
B32B 27/40 (2006.01)

(52) U.S. Cl. .................... 428/343; 428/40.1; 428/42.1; 428/41.6; 428/31; 428/354; 428/355 R

(58) Field of Classification Search ................ 428/343, 428/40.1, 42.1, 41.6, 31, 354, 355 R
See application file for complete search history.

(56) References Cited

U.S. PATENT DOCUMENTS

| 5,968,657 A | 10/1999 | Scullin et al. |
| 6,001,947 A * | 12/1999 | Brünnemann et al. ......... 528/28 |
| 6,207,272 B1 * | 3/2001 | Takahira et al. ...... 428/355 AC |
| 2002/0192462 A1 * | 12/2002 | Kondo ....................... 428/343 |

FOREIGN PATENT DOCUMENTS

| EP | 0 503 738 A1 | 9/1992 |
| EP | 0 519 278 A2 | 12/1992 |
| JP | 11012547 | 1/1999 |
| WO | WO 94/09983 | 5/1994 |
| WO | WO 97/42041 | 11/1997 |
| WO | WO 00/51799 | 9/2000 |

OTHER PUBLICATIONS

Jap Patent Abstract Machine Translation 11-012547 Nitto Denko Corp, (Jan. 19, 1999).*

* cited by examiner

Primary Examiner—Daniel Zirker
(74) Attorney, Agent, or Firm—Brinks Hofer Gilson & Lione; G. Peter Nichols

(57) ABSTRACT

An application sheet adapted to be used by being stuck to a surface of a paint layer of a painting adhesive sheet and a method of attaching the painting adhesive sheet are disclosed. The application sheet includes a pressure-sensitive adhesive layer to be stuck onto the surface of the paint layer of the painting adhesive sheet through its one surface, the pressure-sensitive adhesive layer being formed of a pressure-sensitive adhesive composition containing a pressure-sensitive adhesive and at least one of a plasticizer and a silicone oil; and a base material provided on the other surface of the pressure-sensitive adhesive layer. It is preferred that the plasticizer contains phthalate ester and the molecular weight of the plasticizer is equal to or less than 400. Further, it is preferred that the amount of the plasticizer contained in the pressure-sensitive adhesive layer is 0.05 to 20 parts by weight.

2 Claims, 2 Drawing Sheets

APPLICATION SHEET USED FOR PRESSURE-SENSITIVE ADHESIVE SHEET FOR PAINTING

BACKGROUND OF THE INVENTION

1. Field of the Invention

This invention relates to an application sheet used for a pressure-sensitive adhesive sheet for painting and a method of attaching the pressure-sensitive adhesive sheet for painting.

2. Description of the Prior Art

Recently, there are cases that outer surfaces of body parts of vehicles such as doors, bon-nets, fenders, and roofs of recreational vehicles and side covers and fuel tanks of motor-bicycles undergo multicolor painting as accents or for providing beautiful appearance and high quality feelings.

Such multicolor painting has been conventionally carried out, for example, by spray painting in which a paint is sprayed onto a material surface to be painted after a preliminary treatment such as a primary coating has been made.

However, such spray painting needs to perform steps for spraying a paint and then drying it in each of painted colors, so that it takes a relatively long time to complete all the painting steps, thus resulting in lowered productivity. Further, volatile organic solvent is discharged into the atmosphere in each spraying step causing environmental problems at working sites.

In order to solve such problems, a coloring method using a pressure-sensitive adhesive sheet for painting (hereinafter, referred to "painting adhesive sheet") has been proposed. The painting adhesive sheet used in this method is comprised of a paint layer formed into a film state and a pressure-sensitive adhesive layer provided on one surface of the paint layer, and by attaching such a painting adhesive sheet to a material to be painted (adherend), the material can be colored with having the same texture as that obtained by spray painting.

Such painting adhesive sheet is attached to an adherend (a material to be painted) by rubbing the surface of the paint layer thereof with a squeegee or the like so as to expel air between the painting adhesive sheet and the adherend while pressing it against a surface of the adherend in the same manner as other adhesive sheets.

However, in such a painting adhesive sheet, it is difficult to give sufficient abrasion resistance to the surface of the paint layer thereof. Therefore, when the painting adhesive sheet is attached to an adherend in such a manner as described above, the surface of the paint layer is liable to be scratched by the squeegee or the like, so that appearance of the painting adhesive sheet after it has been attached to the adherend tends to be poor.

SUMMARY OF THE INVENTION

It is therefore an object of the present invention to provide an application sheet used for a painting adhesive sheet which can provide good environment and excellent appearance after the painting adhesive sheet has been attached to an adherend, and a method of attaching such a painting adhesive sheet.

In order to achieve the object mentioned above, the present invention is directed to an application sheet adapted to be used by being stuck to a surface of a paint layer of a painting adhesive sheet. The application sheet comprises a pressure-sensitive adhesive layer to be stuck to the surface of the paint layer of the painting adhesive sheet through its one surface, the pressure-sensitive adhesive layer being formed of a pressure-sensitive adhesive composition containing a pressure-sensitive adhesive and at least one of a plasticizer and a silicone oil; and a base material provided on the other surface of the pressure-sensitive adhesive layer.

In the present invention described above, it is preferred that the pressure-sensitive adhesive composition of the pressure-sensitive adhesive layer contains a plasticizer comprised of phthalate ester, and the amount of the plasticizer contained in the pressure-sensitive adhesive composition is in the range of 0.05 to 20 parts by weight with respect to 100 parts by weight of the pressure-sensitive adhesive.

Further, it is also preferred that the molecular weight of the plasticizer comprised of phthalate ester is equal to or less than 400.

Furthermore, it is also preferred that the at least one of the plasticizer and the silicone oil functions to provide lubricity to the surface of the paint layer of the painting adhesive sheet during the application sheet being stuck to the surface of the paint layer of the painting adhesive sheet.

According to the application sheet of the present invention as described above, the plasticizer or silicone oil contained in the pressure-sensitive adhesive layer is migrated to the surface of the paint layer during the application sheet being stuck to the surface of the paint layer of the painting adhesive sheet, thereby providing lubricity to the surface of the paint layer of the painting adhesive sheet. Therefore, scratches are hard to be formed on the surface of the paint layer of the painting adhesive sheet when the surface of the paint layer is rubbed by a squeegee or the like for attaching the painting adhesive sheet to an adherend. With this result, the painting adhesive sheet can provide excellent appearance even after it has been attached to an adherend, and the deterioration of luster is not liable to occur.

Another aspect of the present invention is directed to a method of attaching a painting adhesive sheet having a paint layer to an adherend, wherein the painting adhesive sheet is adapted to be used together with an application sheet when it is attached to the adherend, and the application sheet comprises a pressure-sensitive adhesive layer to be stuck to the surface of the paint layer of the painting adhesive sheet through its one surface, the pressure-sensitive adhesive layer being formed of a pressure-sensitive adhesive containing at least one of a plasticizer and a silicone oil; and a base material provided on the other surface of the pressure-sensitive adhesive layer, wherein this method comprises the steps of sticking the application sheet to the surface of the paint layer of the painting adhesive sheet; attaching the painting adhesive sheet with the application sheet to the adherend; and peeling off and removing the application sheet from the surface of the paint layer of the painting adhesive sheet.

In this method, it is preferred that the pressure-sensitive adhesive composition of the pressure-sensitive adhesive layer contains a plasticizer comprised of phthalate ester, and the amount of the plasticizer contained in the pressure-sensitive adhesive composition is in the range of 0.05 to 20 parts by weight with respect to 100 parts by weight of the pressure-sensitive adhesive.

Further, it is also preferred that the molecular weight of the plasticizer comprised of phthalate ester is equal to or less than 400.

Furthermore, it is also preferred that the at least one of the plasticizer and the silicone oil functions to provide lubricity to the surface of the paint layer of the painting adhesive sheet during the application sheet being stuck to the surface of the paint layer of the painting adhesive sheet.

These and other objects, structures and advantages of the present invention will be apparent when the following description of the preferred embodiments will be considered taken in conjunction with the accompanying drawings.

DETAILED DESCRIPTION OF THE INVENTION

Hereinbelow, preferred embodiments of an application sheet used for a painting adhesive sheet according to the present invention (hereinafter, simply referred to as "application sheet") and a method of attaching the painting adhesive sheet will be described in detail with reference to the accompanying drawings.

Figure 1:
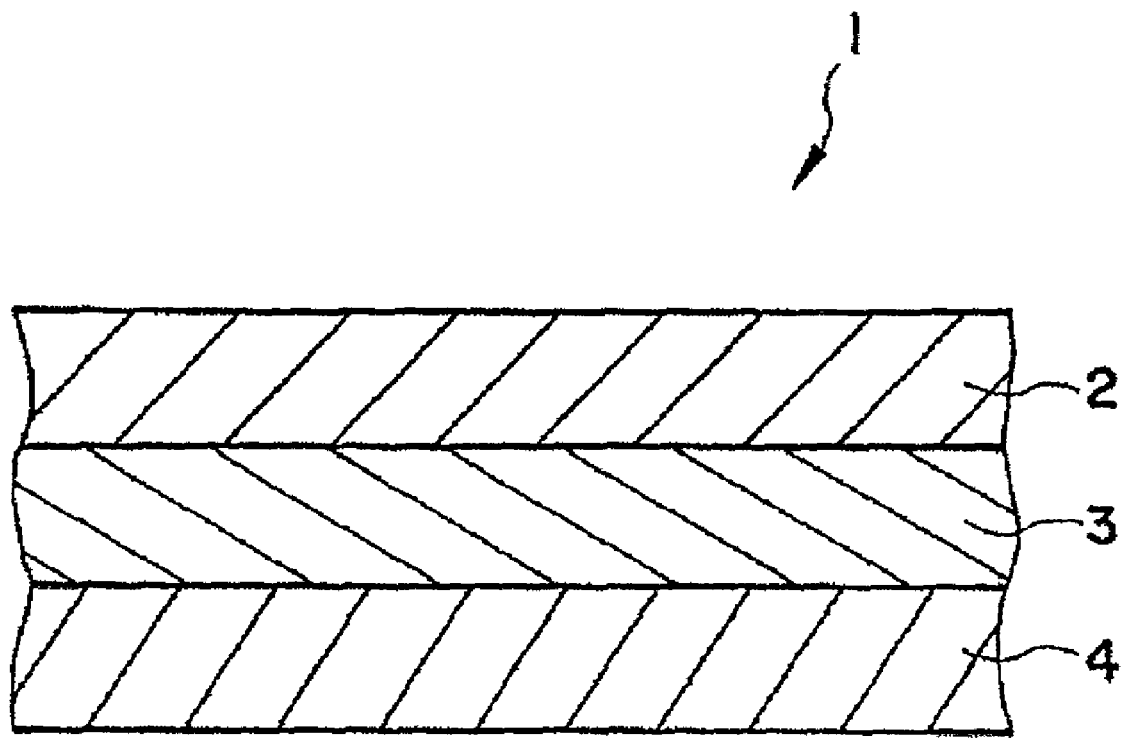
FIG. 1 is a sectional view which shows a first embodiment of an application sheet according to the present invention.
Figure 2:
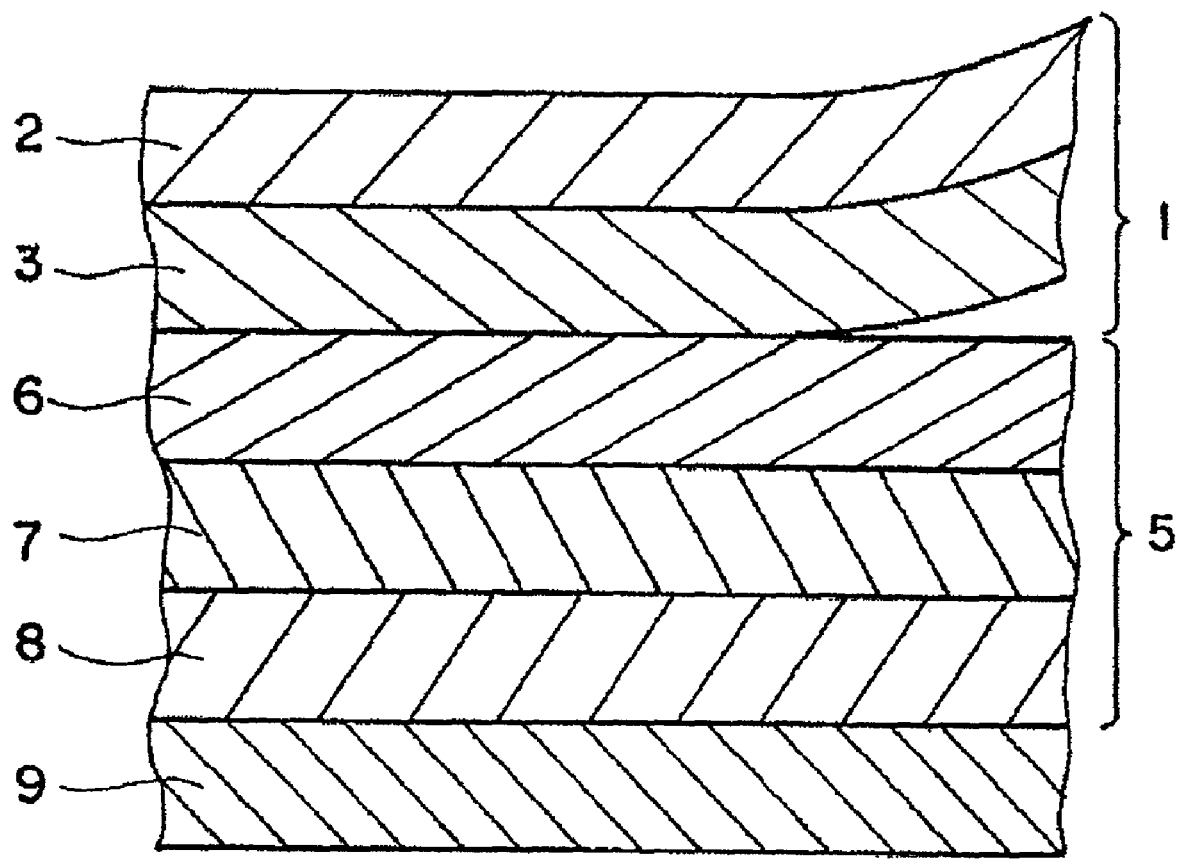
FIG. 2 is a sectional view which shows a state where a release liner of the application sheet shown in FIG. 1 is peeled off and then the application sheet is stuck to a painting adhesive sheet.

As shown in FIGS. 1 and 2, an application sheet 1 of the present invention comprises a base material 2 and a pressure-sensitive adhesive layer 3 provided on one surface of the base material 2. The application sheet 1 is used by being stuck to a painting adhesive sheet 5 ("pressure-sensitive adhesive sheet for paining", which will be described later in detail). The application sheet 1 has a function of giving stiffness to the painting adhesive sheet 5 to improve handlability thereof when the painting adhesive sheet is attached to an adherend as well as a function of preventing scratches from being formed on a paint layer 6 of the painting adhesive sheet 5 when the painting adhesive sheet is attached to the adherend.

Hereinbelow, a detailed description will be made with regard to the respective elements of the application sheet 1 mentioned above.

The base material 2 is constituted from a transparent sheet. A resin film having high transparency is preferably used for the base material 2. This improves handlability when attaching the painting adhesive sheet to an adherend since boundary parts between the colors in the paint layer 6 of the painting adhesive sheet 5 can be seen clearly.

A material constituting the resin film for the base material 2 is not particularly limited to a specific one, and examples of such resin film include polyolefin films such as polyethylene film, polypropylene film and polyvinyl chloride film, polyethylene terephthalate (PET) films, and ethylene-vinylacetate copolymer films. Among these resin films, a film containing at least either polyethylene terephthalate or polyvinyl chloride is particularly preferred. Further, paper materials such as crepe paper, Japanese paper, bond paper and glassine paper may be used for the base material 2 as long as they are formed into transparent papers. By constituting the base material 2 from these materials mentioned above, it is possible to give appropriate flexibility and stiffness to the painting adhesive sheet 5 when the application sheet having such base material 2 is stuck to the painting adhesive sheet 5.

The thickness of the base material 2 is not particularly limited to a specific value, but is preferably in the range of 6 to 200 $\mu$m, and more preferably in the range of 25 to 100 $\mu$m.

If the thickness of the base material 2 is less than the above lower limit value, there are cases that the base material 2 is broken upon peeling-off of the application sheet 1 from the painting adhesive sheet 5 and that it is not possible to give sufficient stiffness to the painting adhesive sheet 5 (which will be described later) so that handlability in attaching the painting adhesive sheet 5 to an adherend (i.e., workability for attaching the painting adhesive sheet 5) is lowered. On the other hand, if the thickness of the base material 2 exceeds the above upper limit value, there is a case that flexibility is impaired so that attaching (sticking) of the painting adhesive sheet to an adherend becomes difficult.

The pressure-sensitive adhesive layer 3 is formed of a pressure-sensitive adhesive composition which contains as its main ingredient a pressure-sensitive adhesive and also contains a plasticizer or silicone oil. Namely, in the present invention, at least one of the plasticizer and the silicone oil is contained in the pressure-sensitive adhesive layer 3 of the application sheet 1. In this regard, it is to be noted that both the plasticizer and the silicone oil may be contained in the pressure-sensitive adhesive layer 3.

Examples of such pressure-sensitive adhesive include acryl based pressure-sensitive adhesives, silicone based pressure-sensitive adhesives, rubber based pressure-sensitive adhesives, polyester based pressure-sensitive adhesives, polyurethane based pressure-sensitive adhesives, ethylene-vinyl acetate copolymer based pressure-sensitive adhesives, and the like. When the pressure-sensitive adhesive layer 3 contains an acryl based pressure-sensitive adhesive, the application sheet has especially excellent heat resistance, transparency, durability, weatherability, and the like.

When the pressure-sensitive adhesive layer 3 contains a rubber based pressure-sensitive adhesive, the application sheet can be easily fitted onto the surface of the painting adhesive sheet, thus leading to excellent handlability in sticking and peeling off the application sheet to and from the painting adhesive sheet. These effects become particularly conspicuous when a rubber based pressure-sensitive adhesive containing at least either butyl rubber or polyisobutylene therein is used.

As described above, the pressure-sensitive adhesive layer 3 contains either the plasticizer or silicone oil. Because of this, when the application sheet 1 is stuck to the surface of the paint layer 6 of the painting adhesive sheet 5, at least a part of the plasticizer or silicone oil contained in the pressure-sensitive adhesive layer 3 is migrated to the surface of the paint layer 6. This makes it possible for the surface of the paint layer 6 of the painting adhesive sheet 5 (i.e., the surface to which the application sheet 1 is stuck) to have excellent lubricity. As a result, scratches are hard to be formed on the surface of the paint layer 6 even if the surface of the paint layer is rubbed (i.e., the surface of the paint layer 6 can have excellent abrasion resistance).

Examples of the plasticizer to be contained in the pressure-sensitive adhesive layer 3 include phthalate ester based plasticizers such as dimethyl phthalate (DMP), diethyl phthalate (DEP), dibutyl phthalate (DBP), diheptyl phthalate (DHP), dioctyl phthalate (DOP), dinonyl phthalate (DNP), diisononyl phthalate (DINP), diisodecyl phthalate (DIDP), butylbenzyl phthalate (BBP), dicyclohexyl phthalate (DCHP), octyldecyl phthalate, and hydrophthalic anhydride ester; phosphoric ester based plasticizers such as triethyl phosphate (TEP); aliphatic ester based plasticizers such as dioctyl adipate (DOA), diisodecyl adipate (DIDA) and dibutyl sebacate (DBS); trimellitate based plasticizers such as trioctyl trimellitate (TOT); epoxy based plasticizers; stearic acid based plasticizers; and rubber based plasticizers; and the like. Among these plasticizers, phthalate ester (diester phthalate) based plasticizers are especially preferred.

When the plasticizer contained in the pressure-sensitive adhesive layer 3 is a phthalate ester based plasticizer, the plasticizer is easily migrated to the surface of the paint layer 6 of the painting adhesive sheet 5. With this result, the painting adhesive sheet 5 can obtain the abrasion resistance effect even if the amount of the plasticizer added to the pressure-sensitive adhesive layer 3 is relatively small.

Further, a molecular weight of the phthalate ester based plasticizer contained in the pressure-sensitive adhesive layer 3 is not particularly limited to a specific value, but is preferably equal to or less than 400, and more preferably in the range of 150 to 400.

If the molecular weight of the plasticizer contained in the pressure-sensitive adhesive layer 3 exceeds 400, the plasticizer contained in the pressure-sensitive adhesive layer 3 can not be satisfactorily migrated to the surface of the paint layer 6 of the painting adhesive sheet 5. As a result, it is not possible to satisfactorily prevent scratches from being produced on the surface of the painting adhesive sheet 5.

Further, when the plasticizer is contained in the pressure-sensitive adhesive layer 3, its content is not particularly limited to a specific value, but is preferably in the range of 0.05 to 20 parts by weight with respect to 100 parts by weight of the pressure-sensitive adhesive, and more preferably in the range of 0.1 to 10 parts by weight.

If the content of the plasticizer is less than the above lower limit value, there is a case that the effects of the present invention can not be sufficiently obtained. On the other hand, if the content of the plasticizer exceeds the above upper limit value, there is a case that the plasticizer contained in the pressure-sensitive adhesive layer 3 is excessively migrated to the surface of the paint layer 6 of the painting adhesive sheet 5 so that the appearance of the painting adhesive sheet is impaired.

Examples of the silicone oil to be contained in the pressure-sensitive adhesive layer 3 include dimethyl siloxane based silicone oil, phenyl methyl siloxane based silicone oil, alkyl-modified silicone oil, fluoroalkyl siloxane based silicone oil, polyether-modified silicone oil, fatty ester-modified silicone oil, and the like. If the silicone oil is used, its content is preferably in the range of 0.05 to 20 parts by weight with respect to 100 parts by weight of the pressure-sensitive adhesive, and more preferably in the range of 0.1 to 10 parts by weight.

If the content of the silicone oil is less than the above lower limit value, there is a case that the effects of the present invention can not be sufficiently obtained. On the other hand, if the content of the silicone oil exceeds the above upper limit value, there is a case that the silicone oil is excessively migrated to the painting adhesive sheet so that the appearance of the painting adhesive sheet is impaired.

Further, the pressure-sensitive adhesive layer 3 may optionally contain a cross-linking agent, a tackifier, an anti-aging agent, a stabilizer, an ultraviolet absorbent or the like as needed in addition to the above-mentioned pressure-sensitive adhesive, plasticizer and silicone oil.

The thickness of the pressure-sensitive adhesive layer 3 is not particularly limited to a specific value, but is preferably in the range of 1 to 50 $\mu$m, and more preferably in the range of 10 to 30 $\mu$m.

If the thickness of the pressure-sensitive adhesive layer 3 is less than the above lower limit value, there is a case that the pressure-sensitive adhesive layer 3 can not satisfactorily support the painting adhesive sheet 5 due to insufficient adhesive strength thereof. On the other hand, if the thickness of the pressure-sensitive adhesive layer 3 exceeds the above upper limit value, there is a case that the pressure-sensitive adhesive layer 3 is difficult to be peeled off from the painting adhesive sheet 5, tackiness remains on the painting adhesive sheet or the pressure-sensitive adhesive bleeds out from the application sheet 1, thus leading to lowered handlability.

Further, it is preferred that the adhesive strength of the pressure-sensitive adhesive layer 3 of the application sheet 1 is smaller than that of a pressure-sensitive adhesive layer 8 (described later) of the painting adhesive sheet 5. Specifically, the adhesive strength of the pressure-sensitive adhesive layer 3 with respect to the surface of the paint layer 6 of the painting adhesive sheet 5 is preferably equal to or less than 5 N/25 mm, and is more preferably about in the range of 0.5 to 3 N/25 mm. By setting the adhesive strength of the pressure-sensitive adhesive layer 3 to the above range, the application sheet 1 can be more smoothly peeled off when the painting adhesive sheet 5 is used.

Further, as shown in FIG. 1, a release liner 4 is stuck to the pressure-sensitive adhesive layer 3 of the application sheet 1 of the present invention as needed. This prevents attachment of dust or dirt on the pressure-sensitive adhesive layer 3 and blocking until the application sheet 1 is used, so that handlability and storage properties can be improved.

Examples of such release liner 4 include various papers such as glassine paper, bond paper or films which have been subjected to a surface treatment with a releasing agent such as silicone, wax, fluororesin or the like, and a polyethylene terephthalate (PET) film or foamed polyethylene terephthalate (PET) film having releasability in itself. In this regard, it is preferred that a release-treated film or a film which is formed of a material having releasability in itself and has a smooth surface is used for the release liner 4 because the surface of the pressure-sensitive adhesive layer 3 (i.e., the surface to which the release liner 4 is stuck) becomes smooth.

The thickness of the release liner 4 is not particularly limited to a specific value, but is preferably in the range of about 50 to 200 $\mu$m.

The application sheet of the present invention described above can be manufactured, for example, by applying the above-mentioned pressure-sensitive adhesive composition onto the surface of the base material 2 to form the pressure-sensitive adhesive layer 3 and then sticking the release liner 4 onto the pressure-sensitive adhesive layer 3 as needed. Alternatively, the application sheet 1 can also be manufactured by applying the above-mentioned adhesive composition onto the surface of the release liner 4 which has been release-treated to form the pressure-sensitive adhesive layer 3 and then transferring the pressure-sensitive adhesive layer 3 to the base material 2.

In this regard, it is to be noted that a method of applying the pressure-sensitive adhesive composition to the surface of the base material 2 or the release liner 4 is not particularly limited, but examples of the method include various coating methods using a roll knife coater, dye coater, roll coater, bar coater, gravure roll coater or reverse roll coater, and dipping, and the like.

Such application sheet 1 is used by being stuck to the surface of the paint layer 6 of the painting adhesive sheet (pressure-sensitive adhesive sheet for painting) 5.

The painting adhesive sheet 5 to which the application sheet 1 of the present invention is to be stuck comprises the paint layer 6 and the pressure-sensitive adhesive layer 8. In more detail, as shown in FIG. 2, a base material 7 is provided between the paint layer 6 and the pressure-sensitive adhesive layer 8, and a release liner 9 is stuck onto the surface of the pressure-sensitive adhesive layer 8.

Hereinbelow, a detailed description will be made with regard to the respective elements of the painting adhesive sheet 5 mentioned above.

The pressure-sensitive adhesive layer 8 of the painting adhesive sheet 5 can be formed of conventionally used pressure-sensitive adhesives. For example, it is possible to selectively use any one of the above-mentioned pressure-sensitive adhesives used for forming the pressure-sensitive adhesive layer 3 of the application sheet 1. In this regard, it is to be noted that heat-sensitive adhesives may be used for that layer.

The paint layer 6 is not particularly limited to a specific one, but it is preferred that the paint layer 6 is provided by forming a paint itself into a film state (that is, the paint layer 6 is formed of a paint itself). This makes it possible for the paint layer 6 to have excellent color reproducibility and color development so that such a paint layer 6 can be substituted for the conventional painting formed by spraying a paint onto a material to be painted. Further, unlike the conventional colored films for painting such as a colored film which is produced by adding a pigment or the like into a structural material of a film layer to be formed into a sheet-like film or a colored film on which a screen printing is made, the paint layer 6 described above has excellent color reproducibility. Therefore, even in the case of applying metallic color, good painting can be made without occurrence of uneven coloring, stripes or the like.

Further, the paint layer 6 formed of a paint itself can be formed into an extremely thin layer so that the entire painting adhesive sheet 5 becomes thin. As a result, the painting adhesive sheet 5 has excellent flexibility and followability so that it can be easily attached to curved surfaces such as corner portions, edge portions and large area portions of an adherend.

A paint constituting the paint layer 6 is not particularly limited to a specific paint, and ordinary paints used for painting external surfaces of automobiles can be used. Examples of such paints for painting external surfaces of automobiles include paints containing as their major component pigments and resins for dispersing the pigments, and the like.

Examples of the resins to be used include urethane based resins, epoxy based resins, polyester based resins, and the like. These resins can be optionally combined depending on a material to be painted (adherend). Among these resins, urethane based resins are preferred. If the paint containing as its main component an urethane based resin is used, the paint is curable at a relatively low temperature, so that the paint layer 6 formed of the paint itself can be formed with ease.

Further, examples of the pigments to be used include conventional pigments such as various organic pigments, inorganic pigments, natural dyestuffs, and the like.

Furthermore, the paint layer 6 may be formed with a clear paint layer. The clear paint layer is formed of a transparent paint and it is painted on the outermost of the paint layer 6 to protect the base paint and give luster to the painting. When such a clear paint layer is used for the paint layer 6, in order to give coloring to the painting adhesive sheet 5, the paint layer 6 is formed into plural layers including a colored paint layer as a lower layer and a clear paint layer as an upper layer. Alternatively, a painting adhesive sheet in that a base material 7 (described later) is colored and a paint layer formed of a clear paint is provided on the colored base material 7 may also be used.

In the case where the paint layer 6 is provided with the clear paint layer, the thickness of the paint layer 6 excepting the clear paint layer is preferably in the range of 5 to 40 $\mu$m, and more preferably in the range of 7 to 20 $\mu$m. Alternatively, in the case where the paint layer 6 is formed into the clear paint layer, the thickness of the paint layer 6, that is the thickness of the clear paint layer is preferably in the range of 5 to 50 $\mu$m, and more preferably in the range of 20 to 40 $\mu$m.

If the thickness of the paint layer 6 is less than the above lower limit value, color development and luster become insufficient so that there is a case that finish is poor. On the other hand, if the thickness of the paint layer 6 exceeds the above upper limit value, flexibility and followability to curved surfaces are impaired so that there is a case that attaching workability of the painting adhesive sheet is lowered.

The painting adhesive sheet 5 having such paint layer 6 described above has advantages that it causes less environmental problems at working sites and an appearance provided by the painting adhesive sheet 5 is not inferior to an appearance obtained by spray painting. On the other hand, however, as described above, such painting adhesive sheet 5 has a disadvantage that the surface of the paint layer has a relatively lower abrasion resistance as compared with the painting obtained by the spray painting.

Further, a hardenable pressure-sensitive adhesive may be used to form the pressure-sensitive adhesive layer 8. The hardenable pressure-sensitive adhesive is formed by adding a thermosetting resin to the afore-mentioned pressure-sensitive adhesive. Such hardenable pressure-sensitive adhesive exhibits sufficient adhesive strength at a room temperature and it is cured by heating to increase the adhesive strength. Therefore, by using such hardenable pressure-sensitive adhesive in the pressure-sensitive adhesive layer 8, attaching (sticking) property of the painting adhesive sheet 5 and adhesion between the paint layer 6 and the pressure-sensitive adhesive layer 8 can be effectively improved.

The adhesive strength of the painting adhesive sheet 5 formed by using such pressure-sensitive adhesive with respect to an adherend is preferably equal to or more than 5 N/25 mm, and more preferably equal to or more than 10 N/25 mm. In this regard, it is to be noted that in the case of the hardenable pressure-sensitive adhesive mentioned above, the adhesive strength means a value after it is cured by heating.

The above-mentioned pressure-sensitive adhesive used in the pressure-sensitive adhesive layer 8 may optionally contain a tackifier, a softener, an anti-aging agent, a stabilizer, an ultraviolet absorbent or the like as needed.

The thickness of the pressure-sensitive adhesive layer 8 is not particularly limited to a specific value, but is preferably in the range of 5 to 100 $\mu$m, and more preferably in the range of 20 to 50 $\mu$m.

If the thickness of the pressure-sensitive adhesive layer 8 is less than the above lower limit value, there is a case that sufficient adhesive strength can not be obtained. On the other hand, if the thickness of the pressure-sensitive adhesive layer 8 exceeds the above upper limit value, there is a case that the flexibility of the painting adhesive sheet 5 is impaired and the pressure-sensitive adhesive bleeds out from the painting adhesive sheet and the like, thus leading to lowered handlability.

Further, as described above, the painting adhesive sheet 5 may have the base material 7 between the paint layer 6 and the pressure-sensitive adhesive layer 8. In this case, it is preferred that the base material 7 has excellent dimensional stability against environmental conditions such as changes in temperature, humidity, and the like. Further, it is also preferred that the base material 7 has flexibility and followability to curved surfaces when the painting adhesive sheet 5 is attached to an adherend, and is suited for cutting, stamping or the like when it is processed.

A material constituting such base material 7 is not particularly limited, and examples of such material include films made of resins such as polyester (e.g., polyethylene terephthalate (PET)), polyvinyl chloride, polypropylene (PP), polyalylate, polyurethane, polycarbonate, polyamide, triacetyl cellulose (TAC), and the like.

The thickness of the base material 7 is not particularly limited to a specific value, but is preferably in the range of 25 to 200 μm, and more preferably in the range of 50 to 150 μm.

In this regard, it is to be noted that, as described above, the base material 7 may be formed from a colored film in the case where the clear paint is used for the paint layer 6.

Further, if necessary, a release liner 9 is stuck onto the surface of the pressure-sensitive adhesive layer 8 of the painting adhesive sheet 5 which is opposite to the surface on which the paint layer 6 is provided. Such a release liner is served to prevent attachment of dust or dirt on the pressure-sensitive adhesive layer 8 and blocking until the painting adhesive sheet 5 is used, so that handlability and storage properties are improved.

The release liner 9 can be selected from the aforementioned release liners used for the release liner 4. The thickness of the release liner 9 is not particularly limited to a specific value, but is preferably about in the range of 50 to 200 μm.

Next, a description will be made with regard to a method of attaching the painting adhesive sheet using the application sheet of the present invention.

First, the application sheet 1 of the present invention is stuck to the surface of the paint layer 6 of the painting adhesive sheet 5 (see FIG. 2). Usually, the application sheet 1 is stuck to the surface of the paint layer 6 by pressingly attaching the application sheet 1 to the paint layer 6 successively using a laminator, squeegee or the like so that no bubble is formed between the pressure-sensitive adhesive layer 3 and the paint layer 6. However, in the case where the application sheet 1 provided with the release liner 4 is used, first the release liner 4 is peeled off and removed and then the application sheet 1 is stuck to the paint layer 6 so that the exposed surface of the pressure-sensitive adhesive layer 3 comes into contact with the surface of the paint layer 6.

By sticking the application sheet 1 so that the pressure-sensitive adhesive layer 3 and the paint layer 6 are in contact with each other, at least a part of the plasticizer or silicone oil contained in the pressure-sensitive adhesive layer 3 is migrated to the surface of the paint layer 6. This makes it possible for the surface of the paint layer 6 of the painting adhesive sheet 5 (i.e., the surface to which the application sheet 1 is stuck) to have excellent lubricity. As a result, scratches are hard to be formed (produced) on the surface of the paint layer 6 even if the surface of the paint layer 6 is rubbed by a squeegee or the like (i.e., the surface of the paint layer 6 can have excellent abrasion resistance).

Next, the painting adhesive sheet 5, to which the application sheet 1 has been stuck, is attached to the surface of an adherend. Usually, the painting adhesive sheet 5 is attached to the surface of the adherend by pressingly attaching the painting adhesive sheet 5 to the surface of the adherend successively using a squeegee or the like so that no bubble is formed between the pressure-sensitive adhesive layer 8 and the adherend.

Then, the application sheet 1 is peeled off and removed from the surface of the paint layer 6. Thereafter, portions of the painting adhesive sheet 5 which are to be attached to the edges or corner portions of the adherend by folding the portions are rubbed with a squeegee so that these portions firmly adhere to the edges or corner portions of the adherend. At this time, if the paint layer 6 does not have sufficient lubricity on its surface, many scratches are liable to be formed thereon.

However, as described above, in the present invention, at least a part of the plasticizer or the silicone oil contained in the pressure-sensitive adhesive layer 3 of the application sheet 1 is migrated to the surface of the paint layer 6 to give lubricity thereto. This lubricious surface of the paint layer 6 makes it possible to effectively prevent scratches from being formed on the surface of the paint layer 6 when the paint layer 6 is pressingly rubbed by a squeegee for attaching the painting adhesive sheet 5 to the adherend.

In the present invention, the adherend is not particularly limited, and various articles or parts to which spray painting has been conventionally made for coloring can be used as the adherend. Examples of the adherend include various constructions such as tanks, steel towers and the like in addition to vehicles such as automobiles, motor-bicycles, railway cars, and the like. In particular, outer surfaces of vehicles such as automobiles and the like and resin parts thereof such as bumpers are preferable as the adherend.

In the meantime, at least a part of the plasticizer and/or the silicone oil contained in the pressure-sensitive adhesive layer 3 is migrated to the surface of the paint layer 6 due to a pressure given when the application sheet 1 is stuck to the paint layer 6 of the painting adhesive sheet 5. Therefore, it is preferred that the process for attaching the painting adhesive sheet 5 to the adherend and/or the process for peeling off and removing the application sheet 1 from the painting adhesive sheet 5 are carried out after enough time has passed since the sticking of the application sheet 1 to the painting adhesive sheet 5, that is, after the plasticizer and/or the silicone oil contained in the pressure-sensitive adhesive layer 3 had be sufficiently migrated to the surface of the paint layer 6 of the painting adhesive sheet 5. In this regard, it should be noted that the time required for the plasticizer or the silicone oil contained in the pressure-sensitive adhesive layer 3 to be sufficiently migrated to the surface of the paint layer 6 varies depending on the amount of the plasticizer or the silicone contained in the pressure-sensitive adhesive layer 3 or kinds thereof. For this reason, for example, it is preferred that the application sheet 1 is peeled off after 60 minutes or more time has passed since the sticking of the application sheet 1 to the paint layer 6. By doing so, the plasticizer or the silicone oil contained in the pressure-sensitive adhesive layer 3 is sufficiently migrated to the surface of the paint layer 6 so that the surface of the paint layer 6 (i.e., the surface to which the application sheet 1 is attached) can have sufficient lubricity. Therefore, it is possible to effectively prevent scratches from being formed on the surface of the paint layer 6 even if the surface of the paint layer 6 is rubbed after the application sheet 1 has been peeled off and removed from the painting adhesive sheet 5.

By using the application sheet of the present invention as described above, it is possible to make painting with excellent appearance by a simple process, and this makes it possible to provide various designs with ease and thereby markedly increase the commercial value of automobiles and the like.

Although the application sheet of the present invention and the method of attaching the painting adhesive sheet have been described based on the embodiments shown in the drawings, it should be understood that the present invention is not limited thereto.

EXAMPLES

Next, actual examples of the present invention will be described.

1. Manufacture of Application Sheet

Example 1

First, a base material 2 was prepared and then a pressure-sensitive adhesive composition was applied to its one side by means of a roll knife coater to form a pressure-sensitive adhesive layer 3. Thereafter, the pressure-sensitive adhesive layer 3 formed on the base material 2 was stuck to a release-treated surface of a release liner 4 to manufacture an application sheet 1.

The structures of the base material 2, the pressure-sensitive adhesive layer 3, and the release liner 4 were as follows.

[1] Base Material 2

Constituent material: polyethylene terephthalate

Thickness: 25 μm

[2] Pressure-Sensitive Adhesive Layer 3

Constituent material (pressure-sensitive adhesive composition): 100 parts by weight (solid content) of butyl rubber and 10 parts by weight of DOP (having a molecular weight of 391)

Thickness: 20 μm

[3] Release Liner 4

Constituent material: polyethylene terephthalate treated with a silicone ("PET25GS" manufactured by Lintec Corporation)

Thickness: 25 μm

Examples 2 and 3

Application sheets 1 were manufactured in the same manner as in Example 1 except that the mixing ratio (solid content weight ratio) of the butyl rubber and DOP in the constituent material (pressure-sensitive adhesive composition) of the pressure-sensitive adhesive layer 3 was changed respectively as shown in Table 1.

Example 4

An application sheet 1 was manufactured in the same manner as in Example 1 except that DMP (having a molecular weight of 194) was used as the plasticizer contained in the constituent material (pressure-sensitive adhesive composition) of the pressure-sensitive adhesive layer 3 instead of DOP.

Example 5

An application sheet 1 was manufactured in the same manner as in Example 1 except that TOT (having a molecular weight of 546) was used as the plasticizer contained in the constituent material (pressure-sensitive adhesive composition) of the pressure-sensitive adhesive layer 3 instead of DOP.

Example 6

An application sheet 1 was manufactured in the same manner as in Example 1 except that a mixture of an acryl based pressure-sensitive adhesive (100 parts by weight) and dimethyl siloxane based silicone oil (0.5 parts by weight) was used as the constituent material (pressure-sensitive adhesive composition) of the pressure-sensitive adhesive layer 3.

Examples 7 and 8

Application sheets 1 were manufactured in the same manner as in Example 6 except that the mixing ratio (solid content weight ratio) of the acryl based pressure-sensitive adhesive and the silicone oil in the constituent material (pressure-sensitive adhesive composition) of the pressure-sensitive adhesive layer 3 was changed respectively as shown in Table 1.

Comparative Example

An application sheet 1 was manufactured in the same manner as in Example 1 except that an acryl based pressure-sensitive adhesive to which no plasticizer or silicone oil was added was used as the constituent material (pressure-sensitive adhesive composition) of the pressure-sensitive adhesive layer 3.

The constituent materials of the pressure-sensitive adhesive layers 3 of the application sheets 1 in the respective Examples and Comparative Example and the mixing ratios of them are shown in the following Table 1.

TABLE 1

| | Pressure-Sensitive Adhesive Type | Plasticizer | | Silicone oil |
| --- | --- | --- | --- | --- |
| | | Type | Content* | Content* |
| Example 1 | Butyl rubber | DOP | 1.0 | — |
| Example 2 | Butyl rubber | DOP | 0.1 | — |
| Example 3 | Butyl rubber | DOP | 5.0 | — |
| Example 4 | Butyl rubber | DMP | 1.0 | — |
| Example 5 | Butyl rubber | TOT | 1.0 | — |
| Example 6 | Acryl based pressure-sensitive adhesive | — | — | 0.5 |
| Example 7 | Acryl based pressure-sensitive adhesive | — | — | 0.1 |
| Example 8 | Acryl based pressure-sensitive adhesive | — | — | 1.0 |
| Comparative example | Acryl based pressure-sensitive adhesive | — | — | — |

*unit: parts by weight

2. Attachment to the Painting Adhesive Sheet 5

The application sheet 1 of each of the Examples and Comparative Example was being left at a room temperature for three hours after it was manufactured. Thereafter, the release liner 4 was peeled off and removed from the application sheet 1 and then the exposed surface of the pressure-sensitive adhesive layer 3 of the application sheet 1 was attached to the surface of the paint layer 6 of the painting adhesive sheet 5 by a laminator.

The painting adhesive sheet 5 used for each application sheet was manufactured in the following manner.

A black urethane film having a thickness of 100 μm was prepared as a base material 7, and an acryl urethane based clear paint was applied by spray painting on the one side of the base material 7, and then it was dried to form a paint layer 6 having a thickness of 30 μm. Next, a polyethylene terephthalate film ("PET100GS" manufactured by Lintec Corporation) with the thickness of 100 μm which had been release-treated with a silicone-based release agent was prepared as a release liner 9, and an acryl based pressure-sensitive adhesive ("SK" manufactured by Lintec Corporation) was applied to the release-treated surface of the release liner 9, and then dried so as to have a thickness of 40 μm when dried, to form a pressure-sensitive adhesive layer 8. Then, the pressure-sensitive adhesive layer 8 was laminated on the surface of the base material 7, which is a surface of the base material 7 opposite to the surface on which the paint layer 6 is provided, to manufacture the painting adhesive sheet 5.

The value of the adhesive strength of the obtained painting adhesive sheet 5 with respect to a melamine baked coated steel plate measured according to JIS Z 0237 was 20 N/25 mm.

3. Attachment to Adherend

The painting adhesive sheet 5 having the above-mentioned structure was manufactured, and the release liner 9 of the painting adhesive sheet 5 was peeled off and removed. Then, the exposed surface of the pressure-sensitive adhesive layer 8 was attached to the outer surface of a melamine baked coated steel plate (an adherend). The painting adhesive sheet with the application sheet was attached to the adherend with a squeegee. Thereafter, the application sheet was peeled off and removed from the adherend.

4. Evaluation (1) Abrasion Resistance

For each of the painting adhesive sheets 5, an abrasion resistance test was carried out. First, each painting adhesive sheet 5, to which each of the application sheets 1 manufactured in Examples 1 to 8 and Comparative Example was stuck, was attached to a melamine baked coated steel plate. Then, each application sheet 1 was peeled off and removed from the painting adhesive sheet. The abrasion resistance test was carried out against the surface of the paint layer of each painting adhesive sheet 5 using a rubbing tester type 2.

Further, the test was made under the condition where a friction fabric made of cotton type 3 was rubbed 1,000 times against the surface of the paint layer of each painting adhesive sheet 5. The evaluation of the abrasion resistance was made according to the following criteria.

A: Occurrence of scratches could not be observed at all.

B: Occurrence of scratches could be observed a little but the shape of the paint layer restored after it has been left for 24 hours, so that the existence of the scratches could not be recognized again.

C: Occurrence of scratches could be observed and the existence of the scratches could be recognized a little even if the paint layer has been left for 24 hours.

D: Occurrence of scratches could be observed and the existence of the scratches could be clearly recognized even if the paint layer has been left for 24 hours.

The results obtained are shown in the following Table 2.

(2) Evaluation of Appearance

After the evaluation of abrasion resistance was made by the rubbing tester type 2 as described in the above (1), appearance of the surface of the paint layer of each painting adhesive sheet 5 was evaluated according to the following criteria.

A: Deterioration in luster could not be observed at all.

B: Deterioration in luster could be hardly observed.

C: Deterioration in luster could be observed.

D: Deterioration in luster could be clearly observed.

The results obtained are shown in the following Table 2.

(3) Adhesive Strength

A value at the time when the surface of the paint layer of the painting adhesive sheet 5 was used as an adherend was measured according to JIS Z 0237 for each of the application sheets. The obtained value was used as the adhesive strength of the application sheet 1.

The results obtained are also shown in the following Table 2.

TABLE 2

|  | Abrasion Resistance | Appearance Evaluation | Adhesive Strength (N/25 mm) |
| --- | --- | --- | --- |
| Example 1 | A | A | 1.0 |
| Example 2 | A | A | 1.0 |
| Example 3 | A | A | 0.9 |
| Example 4 | A | A | 1.0 |
| Example 5 | B | B | 1.0 |
| Example 6 | A | A | 3.0 |
| Example 7 | A | A | 3.0 |
| Example 8 | A | A | 2.0 |
| Comp. Exam. | D | D | 2.0 |

These results show that all the painting adhesive sheets to which the respective application sheets of Examples 1 to 8 were attached have excellent abrasion resistance, and luster of the surface of the paint layer of each of the painting adhesive sheets is still maintained after the test by the rubbing tester type 2. In particular, such effects can be more conspicuous by setting the amount of the silicone oil or the plasticizer contained in the pressure-sensitive adhesive layer of the application sheet to be a preferable value.

On the other hand, it can be seen that the painting adhesive sheet to which the application sheet of the Comparative Example was attached has poor abrasion resistance, and luster of the surface of the paint layer is extremely deteriorated due to the friction.

As described above, according to the application sheet of the present invention, the painting adhesive sheet can provide excellent appearance even after it has been attached to an adherend. Further, scratches are hard to be formed on the surface of the paint layer of the painting adhesive sheet, so that the deterioration of luster is not liable to occur.

Further, since the application sheet of the present invention gives appropriate flexibility and stiffness to the painting adhesive sheet, the painting adhesive sheet can have excellent flowability to curved surfaces and have excellent handlability.

Furthermore, painting process can be significantly simplified so that emissions of volatile organic solvents into the atmosphere caused by the painting process can be reduced. In addition, manufacturing efficiency is greatly improved so that cost reduction can be realized.

Moreover, the method of attaching the painting adhesive sheet using the application sheet of the present invention is excellent in reproducibility of a texture of a paint and in handlability. Therefor, the method can be applied to various kinds of articles and designs and therefore is expected to be widely used in various fields.

Finally, it is to be noted that, although the present invention was described above with reference to the embodiment and examples, the present invention is not limited thereto, and various modifications may be made without departing from the spirit of the invention which is defined by the following claims.

What is claimed is:

1. An application sheet for attaching a painting adhesive sheet onto a body of an automobile for painting the body, the painting adhesive sheet comprising a paint layer to which the application sheet is adapted to be removably stuck and a pressure sensitive adhesive layer adapted to be stuck onto the body, wherein the application sheet is used for attaching the painting adhesive sheet onto the body by rubbing the application sheet which is stuck onto the paint layer of the painting adhesive sheet, said application sheet comprising:
   a. a transparent base material made from a transparent resin film, the base material having a first surface and a second surface opposite to the first surface, the second surface being adapted to be rubbed; and
   b. a pressure-sensitive adhesive layer provided on the first surface of the base material so that the application sheet can be removably stuck onto the paint layer of the painting adhesive sheet through the pressure-sensitive adhesive layer and containing
      i. a pressure-sensitive adhesive selected from the group consisting of acryl based pressure-sensitive adhesive and rubber based pressure-sensitive adhesive, and
      ii. a phthalate ester based plasticizer selected from the group consisting of dimethyl phthalate (DMP), diethyl phthalate (DEP), dibutyl phthalate (DBP), diheptyl phthalate (DHP), dioctyl phthalate (DOP), dinonyl phthalate (DNP), diisononyl phthalate (DINP), diisodecyl phthalate (DIDP), butylbenzyl phthalate (BBP), dicyclohexyl phthalate (DCHP), octyldecyl phthalate, and hydrophthalic anhydride ester, wherein the amount of the phthalate ester based plasticizer contained in the pressure-sensitive adhesive layer is in the range of 0.1 to 10 parts by weight with respect to 100 parts by weight of the pressure-sensitive adhesive or a trimellitate based plasticizer such as trioctyl trimellitate (TOT), wherein the trimellitate based plasticizer contained in the pressure-sensitive adhesive layer is in the range of 0.1 to 10 parts by weight with respect to 100 parts by weight of the pressure-sensitive adhesive.

2. The application sheet as claimed in claim 1, wherein the rubber based pressure-sensitive adhesive is selected from the group consisting of butyl rubber and polyisobutylene.

* * * * *